G. White.
Hand-Hole Joints for Boilers.
№ 73557          Patented Jan. 21, 1868

Witnesses.
Theo Tusche
J. A. Fraser

Inventor.
G. White
Per Munn &c
Attorneys.

United States Patent Office.

GILBERT WHITE, OF HARLEM, NEW YORK, ASSIGNOR TO HIMSELF AND GUSTAVUS PIERREZ, OF NEW YORK CITY.

Letters Patent No. 73,557, dated January 21, 1868.

IMPROVEMENT IN HAND-HOLE JOINTS FOR BOILERS.

The Schedule referred to in these Letters Patent and making part of the same.

TO ALL WHOM IT MAY CONCERN:

Be it known that I, GILBERT WHITE, of Harlem, in the county of New York, and State of New York, have invented a new and improved Hand-Hole Cover for Steam-Boilers; and I do hereby declare that the following is a full, clear, and exact description thereof, which will enable those skilled in the art to make and use the same, reference being had to the accompanying drawings, forming part of this specification.

This invention consists in a modification in the packing or gasket of a hand-hole cover for steam-generators, as hereinafter fully shown and described, whereby a tighter joint is obtained than hitherto, and the packing or gasket rendered less liable to become injured or deranged in applying the cover to the hole, and taking it therefrom. In the accompanying sheet of drawings—

Figure 1:
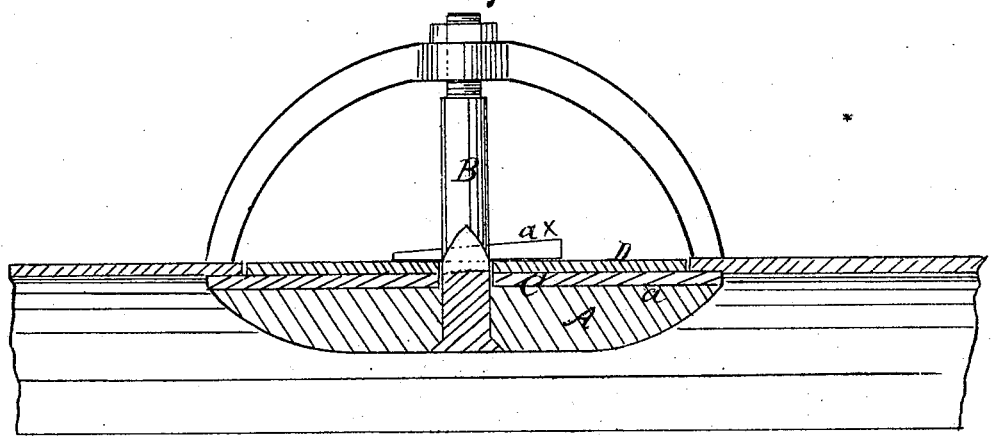
Figure 2:
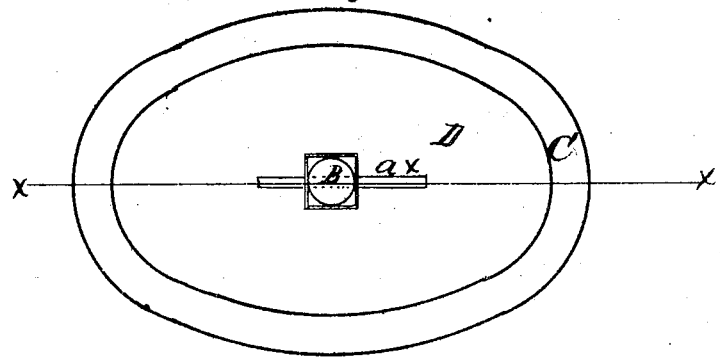

Figure 1 is a longitudinal central section of my invention, taken in the line $x\,x$, fig. 2.

Figure 2, a face view of the same.

Similar letters of reference indicate corresponding parts.

A represents the head of the cover, which may be constructed of cast or wrought iron, having a wrought-iron stem, B, firmly fitted in it, and projecting from it at right angles, as shown in fig. 1. The face side, $a$, of this head, is a plane surface, and upon it the packing C is fitted, covering the whole surface of $a$, a hole being made centrally through the packing, to allow the stem B of the cover A to pass through it. On the packing C there is fitted a plate, D, a hole being made centrally through D, to allow the stem B to pass through, and a key, $a^\times$, passing through the stem, to keep the plate in position. The stem, near the face side $a$ of the cover, is made square, and a square hole is made in the packing and plate, for the square part of the stem to fit in, so as to prevent the packing and plate from turning on the stem. The cover is fitted within the boiler, the edge of the packing lapping over the edge of the hole in the boiler-plate, the plate D being sufficiently smaller than the cover to admit of this. The cover is drawn against the inner side of the boiler, by a nut bearing against a crow-foot on the outer side of the boiler, as shown in red, fig. 1, the packing being thereby clamped between the boiler and the cover, forming a tight joint.

By this simple improvement the packing is kept in good condition, and the cover may be applied to and taken from the hole in the boiler with the greatest facility, and in the event of leakage, wedges may be inserted between the edge of the gasket and the face of the cover, with but little trouble, and a proper pressure of the packing against the edge of the hole obtained, so as to effectually stop leakage. The ordinary packing is an oval ring, which is very liable to get injured in applying the cover to the hole in the boiler, and detaching it therefrom. It frequently sticks to the boiler, and in removing the cover, will frequently get curled over and damaged, so as to be very unreliable when again applied.

I claim as new, and desire to secure by Letters Patent—

The packing C of the face $a$, and the cover A, in combination with the plate D, all constructed and arranged substantially as shown and described.

GILBERT WHITE.

Witnesses:
WM. F. MCNAMARA,
ALEX. F. ROBERTS.